Jan. 2, 1945. N. L. BREWER Re. 22,585

MECHANISM FOR CONTROL OF BREECH BOLT RETURN AND RELEASE OF HAMMER FOR SEMIAUTOMATIC FIREARMS

Original Filed March 14, 1939 3 Sheets-Sheet 1

INVENTOR
NICHOLAS L. BREWER

By Martin & Rendell

ATTORNEYS

Jan. 2, 1945. N. L. BREWER Re. 22,585
MECHANISM FOR CONTROL OF BREECH BOLT RETURN AND RELEASE OF HAMMER FOR SEMIAUTOMATIC FIREARMS
Original Filed March 14, 1939 3 Sheets-Sheet 2
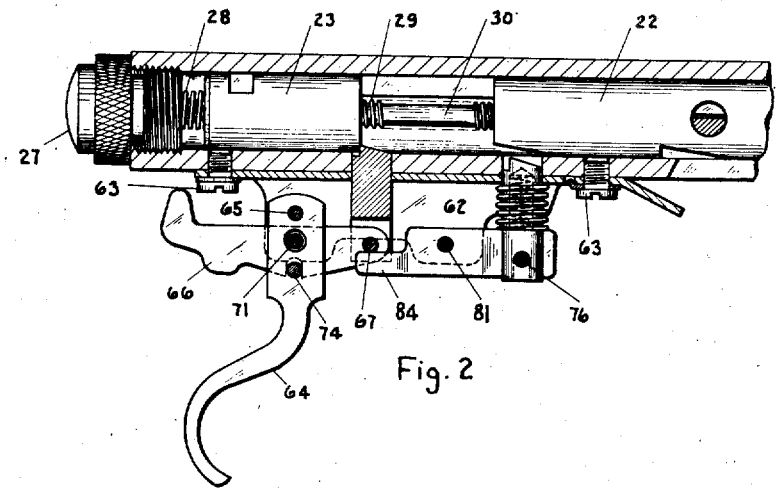
Fig. 2
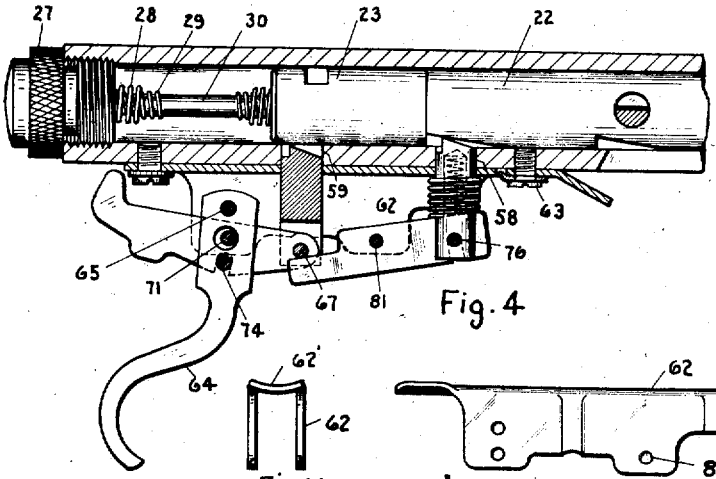
Fig. 4
Fig. 14
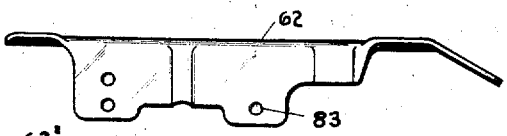
Fig. 13
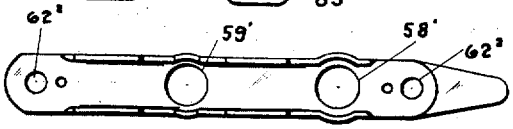
Fig. 15
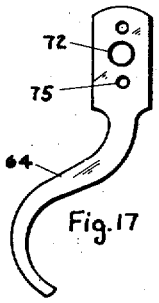
Fig. 17
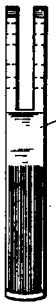
Fig. 18
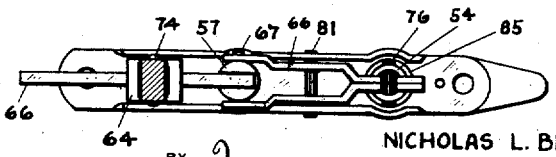
Fig. 16
INVENTOR
NICHOLAS L. BREWER
BY Martin & Rendell
ATTORNEYS Jan. 2, 1945. N. L. BREWER Re. 22,585
MECHANISM FOR CONTROL OF BREECH BOLT RETURN AND RELEASE OF HAMMER FOR SEMIAUTOMATIC FIREARMS
Original Filed March 14, 1939 3 Sheets-Sheet 3
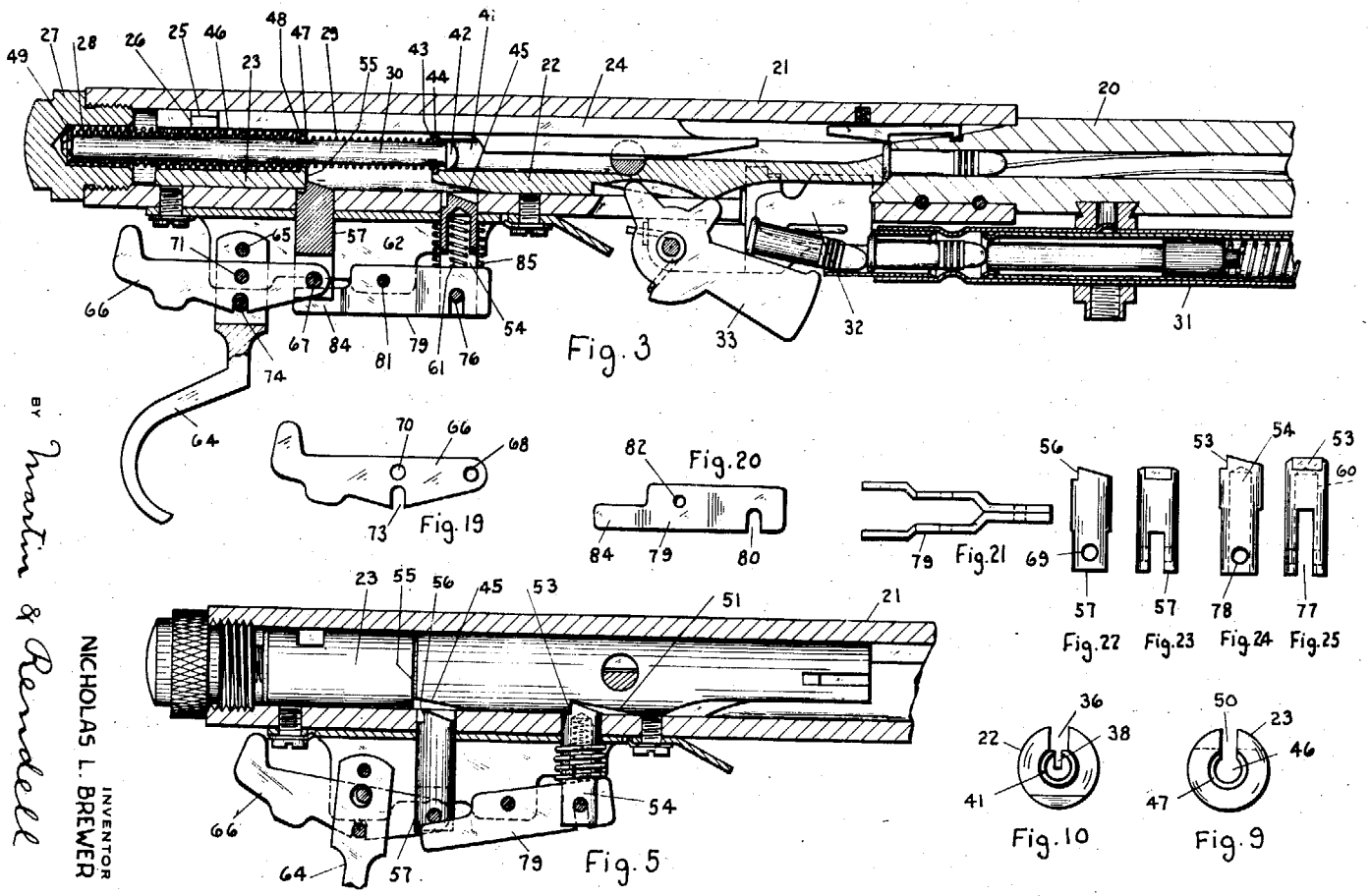
INVENTOR
NICHOLAS L. BREWER
BY Martin & Rendell
ATTORNEYS Reissued Jan. 2, 1945 Re. 22,585

UNITED STATES PATENT OFFICE 22,585

MECHANISM FOR CONTROL OF BREECH BOLT RETURN AND RELEASE OF HAMMER FOR SEMIAUTOMATIC FIREARMS

Nicholas L. Brewer, Utica, N. Y., assignor to Savage Arms Corporation, New York, N. Y., a corporation of Delaware Original No. 2,223,093, dated November 26, 1940, Serial No. 261,804, March 14, 1939. Application for reissue January 19, 1944, Serial No. 518,906

7 Claims. (Cl. 42—3)

This invention relates to an improved construction for semiautomatic firearms or guns. It is related to the type of gun shown in Patent No. 2,224,758 of 1940 granted to me on application filed March 10, 1939, which application was co-pending with the application of my Patent No. 2,223,093, on which the present reissue application is based. This improvement pertains to a better gun combination including the structure, mode of operation and results in the use of a semiautomatic self-loading firearm.

One purpose of this invention is to provide a new and better release or trigger mechanism for semiautomatic or self-loading firearms. As used herein, trigger or release mechanism, unless otherwise clearly limited, refers broadly to the mechanism including the trigger and the means operatively connecting the same to the hammer and generally functioning as a sear in such manner that the pulling of the trigger when the gun is in cocked position will release the spring-tensioned hammer for a firing operation and such release mechanism as herein used includes means for re-engaging the breech bolt and thereby the hammer and holding the breech bolt and thereby the hammer temporarily until the shooter's pull upon the trigger is released, whereupon the breech bolt is free to go to its extreme forward position, but the hammer is allowed to go forward only very slightly until it can be held by the regular release plunger which will hold it in cocked position until the trigger is again pulled.

In a semiautomatic firearm the forward movement of the hammer upon a pull of the trigger and the subsequent backward movement of the hammer after the firing operation both take place with such extreme rapidity that the shooter would not be physically able to release his pull upon the trigger fast enough to allow the hammer-holding means to be in position to hold the hammer by the time the hammer has come to retracted position, if the hammer holding means were of the simple trigger and sear type. For the foregoing reason the release mechanism in a semiautomatic firearm must include means that will temporarily be able to hold the hammer in retracted position until the shooter's pull upon the trigger is released and the regular hammer-holding means become effective for holding the hammer and its operatively connected parts in cocked position.

I have disclosed in my above mentioned Patent No. 2,224,758 a structure in which the release mechanism had one form of means temporarily holding the hammer in retracted position until the shooter released his finger from pulling position upon the trigger, and then the regular hammer-holding means connected with the trigger was brought into engagement with the hammer and held the hammer until the trigger was again pulled. In such a form of release mechanism, however, the breech bolt is allowed to be driven forward by its breech bolt spring without being temporarily held in retracted position and this results in a very rapid return of the breech bolt to its forward position. Such rapid return does have some disadvantage such as in some cases not allowing sufficient time for the proper operation of the cartridge feed mechanism causing a mistimed engagement between the breech bolt and the cartridge, resulting in either deformation of the cartridge case or of the bullet carried thereby, producing bad jams and in some cases interfering with the ejection of the cartridge case from the gun.

To provide a mechanism that will overcome or avoid the objections just named to the best advantage in a gun of the type disclosed is the main purpose of this invention. This I accomplish by providing a release mechanism wherein the means for temporarily engaging and holding the necessary moving parts of the action include the means for temporarily holding the breech bolt in substantially its retracted position and at the same time holding the hammer in rearward position because it is immediately to the rear of the breech bolt and my invention consists in my way of doing this in the combination as I have disclosed and claimed it.

In my previously filed and co-pending application for patent upon release mechanism I provided a regular holding and release plunger engaging the forward part of the hammer and a second plunger called a detent plunger for temporarily engaging a more rearward part of the hammer temporarily. In this present application I use a very similar holding and release plunger engaging a forward part of the hammer, but I place the second or detent plunger in front of instead of to the rear of the regular holding and release plunger and have such second or detent plunger engage the breech bolt itself.

Fig. 2 is a side elevation of the release mechanism of Fig. 1 but showing the housing therefor and the rear part of the receiver in central longitudinal section with the breech bolt and hammer in side elevation therein, the parts being still in cocked position.

Fig. 3 is a vertical central sectional view of most of the parts of the rifle shown in Fig. 1 with the parts still in cocked position.

Fig. 4 is a view similar to Fig. 2 but showing the parts after a firing operation has taken place but before the hammer and breech bolt have been driven rearwardly and before the "pull" upon the trigger has been released.

Fig. 5 is a view similar to Figs. 2 and 4, but after the trigger has been pulled and a hammer and the breech bolt have been driven back and these parts are held retracted by the detent plunger engaging the breech bolt.

Fig. 6 is a side elevation as seen from the right hand side of the breech bolt, hammer, firing pin, hammer spring, breech bolt spring and guide rod for said springs in the relative position they occupy in Fig. 2.

Fig. 7 is a top plan view of the breech bolt, firing pin and hammer as seen when in the position they occupy in Figs. 2 and 6.

Fig. 8 is a view in right hand side elevation of the parts seen in Fig. 5 but after the rifle has been fired and with the hammer and firing pin in extreme forward position but before the "blow back" has driven the breech bolt, hammer and firing pin from their forward position.

Fig. 9 is a rear elevation of the hammer.

Fig. 10 is a rear elevation of the breech bolt.

Figs. 11 and 12 are respectively top and side views of the firing pin.

Fig. 13 is a side view of houring for the release mechanism and Figs. 14 and 15 are respectively rear, end and bottom views thereof.

Fig. 16 is a bottom view of the said housing and of the release mechanism therein with the curved part of the trigger cut away.

Fig. 17 is a right side elevation of the trigger and Fig. 18 is a front edge view of the same.

Fig. 19 is a right side elevation of the release lever.

Fig. 20 is a right side elevation of the right hand detent lever.

Fig. 21 is a top or plan view of both detent levers in the relative position they occupy when in the housing.

Fig. 22 is a side elevation of the release plunger and Fig. 23 is a rear elevation thereof.

Figs. 24 and 25 are respectively side and rear elevations of the detent plunger.

Figure 1:
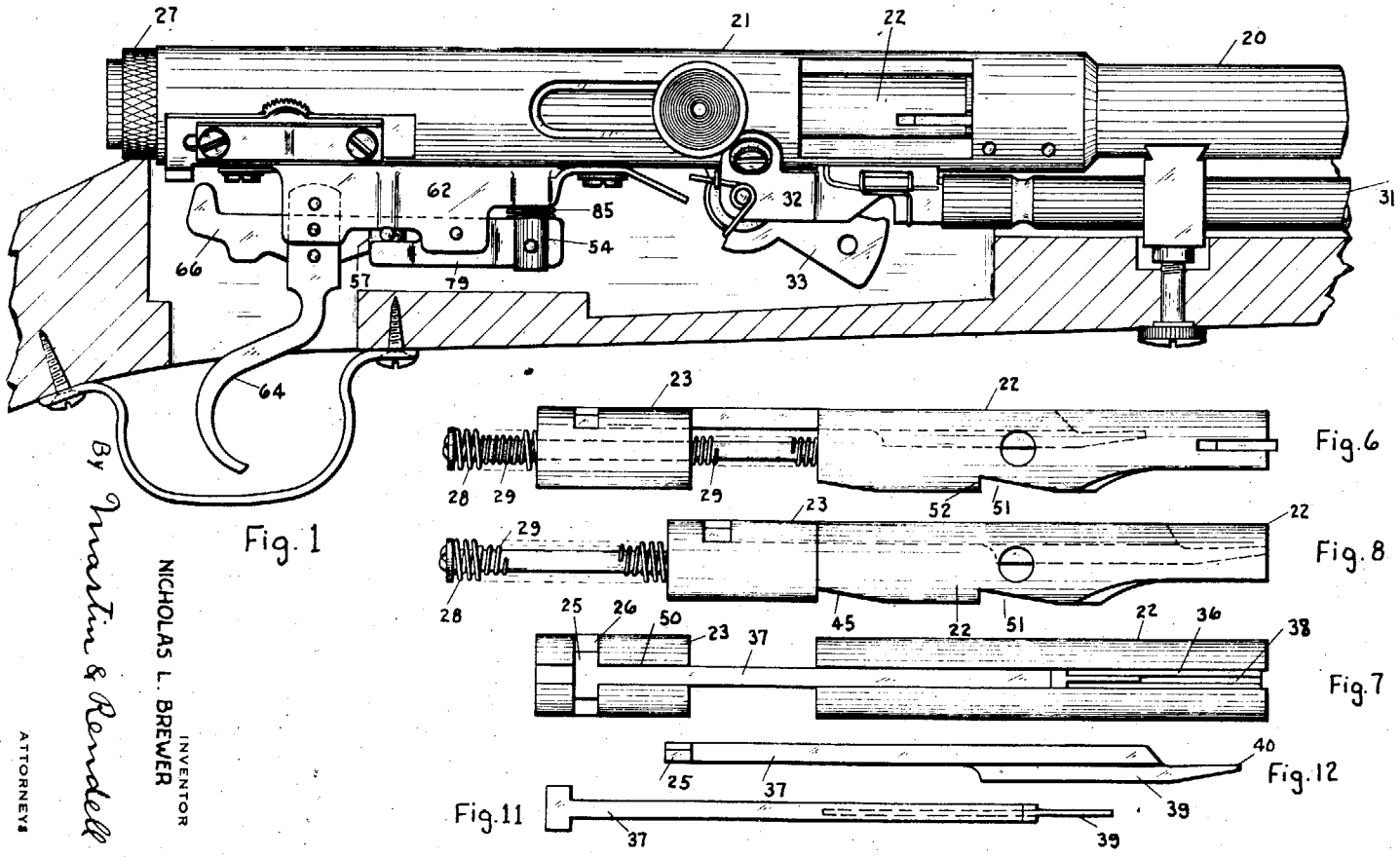
Fig. 1 is a side elevation of the material part of a semiautomatic rifle equipped with a release and breech bolt control mechanism embodying this invention, the adjacent part of the stock being in central longitudinal section and the parts being in the position they occupy when the rifle is cocked.

Referring to the drawings in a more particular description, it will be seen that the invention is shown in connection with a semiautomatic rifle of the blow back type and that said rifle includes a barrel 20 of conventional type to the rearward end of which is fastened securely a backwardly extending hollow receiver 21 in the chamber of which is reciprocatingly mounted the breech bolt 22. To the rear of said breech bolt is placed the hammer 23 to which is operatively connected firing pin 24 which has its forward end slidingly mounted in a longitudinal groove in the breech bolt while the rearward end of said firing pin is connected to the hammer by laterally extending fingers 25 projecting into oppositely disposed pockets 26 located in the top of the hammer.

The rear end of said receiver is normally closed by a recoil plug 27 threaded into the rear end of the chamber of the receiver. This plug has a pocket at its forward end into which projects the rearward end of the hammer spring 28 and the rear end of the breech bolt spring 29, both springs being of helical form and concentrically arranged about their guide rod 30.

The form and co-operation of the hammer, firing pin and breech bolt and of the hammer spring, breech bolt spring and the guide rod therefor and the feature of these parts being so formed and co-operatively assembled as to be easily removed by the removal of the screw-threaded recoil plug as briefly described and shown herein are the subject of a separate patent application filed by me February 1, 1940, as Serial No. 316,752, now Patent No. 2,296,242, of 1942 and are shown and described herein simply for convenient illustration of a sufficiently complete rifle to show the construction and operation of the trigger and release mechanism that forms the subject-matter of this application.

In a similar way the combined breech-bolt locking and operating bolt hereinafter described and to some extent shown on the drawings of this application, is a part of the subject-matter of said patent application filed by me February 1, 1940, as Serial No. 316,752, now Patent No. 2,296,242.

It will be understood that the rifle is equipped with some suitable form of magazine for the cartridges such as a tubular magazine 31 placed below the barrel and with a proper cartridge-feeding device such as suggested by the magazine box 32, the swinging lifter 33 and other parts co-operating therewith as by parts upon the lower side of the forward portion of the breech bolt 22 operating as the breech bolt is carried backward by the blow back from the firing of the gun to extract the shell of the fired cartridge from the bore of the barrel and to eject the said shell from the receiver and to raise a cartridge that has come back from the magazine up into the receiver more or less as required into line with the bore of the barrel so that upon the forward movement of the breech bolt the cartridge is moved into the bore of the barrel and the breech bolt brought into closed position at the rear of the barrel and directly behind the cartridge. No further detailed description of these parts or of these operations is deemed necessary as neither the form of the magazine nor the form or operation of the feeding mechanism nor the form of the part of the breech-bolt co-operating with said feed mechanism constitute any part of my present invention and my invention is capable of being used with various forms of magazines and with various forms of feed mechanisms and various forms of construction of the breech-bolt in its co-operation with the feed mechanism including thereunder the extraction and ejection of the fired shell and the return of the breech-bolt to closed position having meanwhile pushed the new cartridge into its position in the bore of the barrel.

I will now describe the part of the rifle which constitutes the release mechanism itself and the parts more or less closely co-operating therewith in the combination embodying my invention.

The breech bolt 22 is generally cylindrical in shape and has at its upper side a wide slot 36 extending for the full length of the part for the sliding movement therein of the main substantially rectangular portion 37 of the firing pin 25.

Extending downwardly from the bottom of this wide slot 36 is a narrower slot 38 for the reciprocation therein of the fin or web part 39 which projects downward from the forward half of the firing pin as best seen in Fig. 12. The forward end of this fin or web part of the firing pin extends forwardly beyond the rectangular portion and its extreme front end constitutes the firing point 40 of the firing pin. Extending centrally into the breech bolt on its rear end there is provided a bore 41 through which may travel as required the guide rod 30 and particularly its enlarged head 42 at its forward end, the rearwardly facing projecting shoulder of which head acts as a means for retaining upon the said guide rod the forward washer 43, upon removal of the spring and washer assembly. Adjacent the rear end of the breech bolt the bore 41 is enlarged for a very small distance forming a rearwardly facing shoulder 44 adapted to hold said forward washer 43 at the rear end of the breech bolt while allowing the said guide rod 30 to slide through said washer into the bore of the breech bolt, the head 42 of the rod at all times being forward of said washer 43.

A cam face 45 is provided on the lower side of the breech bolt and immediately next to the rear end of the breech bolt with said cam face slanting downwardly as said cam extends forwardly.

The hammer 23 is cylindrical in shape and is reciprocatingly mounted in the chamber of the receiver 21 back of the breech bolt. The hammer has a longitudinally extending central bore 46 which is of large enough diameter to freely receive therein as much as needed of the hammer spring 28. Preferably integral with the body of the hammer there is provided at its forward end a small annular inwardly extending flange 47 and its rear face forms a shoulder 48 engaging the forward end of the hammer spring 28 and thus in an obvious manner adapted to place said hammer spring under compression as the hammer is moved back either by the regular firing of the rifle or by the manual retraction of the breech bolt. The annular flange 47 has its aperture large enough to allow the free passage therethrough of the breech bolt spring 29 and its within located guide rod 30. The forward washer 43 is larger than the opening in said flange 47 at the front of the hammer so that neither said forward washer 43 nor the head 42 of the spring guide rod 30 can pass to the rear of the front face of said washer, which is a useful construction when the parts are out of the gun. The rear end of the two springs upon said guide rod 30 are retained upon said guide rod by a rear washer 49 which in turn is conveniently held against the rear end of said rod as by the rear extremity of said rod being made smaller in diameter than the regular diameter of the rod so as to form a shoulder against which the washer bears while the smaller diametered extremity projects through the hole in the washer and then is riveted over against the rear face of the washer.

In the upper side of the hammer there is provided a longitudinally extending slot 50 corresponding with and in alignment with the slot 36 in the breech bolt for receiving the main nearly rectangular portion 37 of the firing pin and from this slot 50 there project on opposite sides the two already mentioned pockets 26 adapted to receive the two laterally extending fingers 25 already referred to as being provided upon the firing pin near its rear end. The rear end of the firing pin is operatively connected to travel with the hammer simply by the rear part of said firing pin fitting down into the slot 50 of the hammer with the fingers of the firing pin resting into the said pockets 26 of the hammer. It will be seen that the forward end of the firing pin can slide back and forth relative to the breech bolt and that when the hammer is advanced to its extreme forward position relative to the breech bolt the firing pin 40 will project into the cartridge headspace provided upon the front end of the breech bolt into firing position assuming that the breech bolt is in its forward position.

Spaced the hereinafter defined proper distance forwardly from the rear end of the breech bolt there is provided in the lower surface of the breech bolt the detent notch 51 having a substantially upright face or shoulder 52 at its rear end and facing forwardly and a long slanting face extending therefrom forwardly of the breech bolt until it merges with the bottom level of the breech bolt. This forwardly directed face or shoulder is adapted to receive and engage the co-operating rearwardly directed face 53 on the upper end of the detent plunger 54 hereinafter described. The notch 51 forms a clearance space for the upper end of the detent plunger to the front of the face 53 as plainly seen in Fig. 5.

The hammer provides a face 55 at its lower portion at its front end adapted to be engaged by the rearwardly directed point or face 56 at the upper end of the main holding and release plunger 57 hereinafter for brevity simply called the release plunger.

These two plungers (that is the release plunger 57 and the detent plunger 54) are suitably mounted upon the lower side of the receiver to the rear of its central portion with the detent plunger the proper distance forward of the release plunger and they are so mounted relative to the receiver that they are respectively substantially at right angles to the axis of the receiver and preferably also radially arranged relative to the receiver. The inner ends of these two plungers are movably held in proper location by being in correspondingly shaped holes conveniently circular in cross section in the lower wall of the receiver, the hole 58 for the detent plunger and the hole 59 for the release plunger. These holes extend all the way through said lower wall of the receiver so that each plunger can be projected the required slight distance into the chamber of the receiver or retracted from the chamber of the receiver but with even a retracted plunger still held in proper position relative to the receiver by the inner portion of even a retracted plunger being still located in its hole; that is in the wall of the receiver.

The release plunger 57 is preferably circular in cross section and generally cylindrical in shape as appears from the side and rear views thereof, Figs. 22 and 23 respectively. Preferably also its upper and rearwardly directed point or face 56 is formed by cutting away the material at its upper end and the left hand side so as to form a face of substantial extent to co-operate with the face 55 on the front lower end of the hammer 23. The lower end of this release plunger is forked or cut away at its central portion as best shown in the rear view thereof, Fig. 23, for a purpose to be hereafter disclosed.

The detent plunger 54 is likewise cylindrical in general shape and its rearwardly directed face 53 is similarly conveniently formed by cutting away some of the material at its upper end toward the rear so as to form the flat face 53 as appears in Figs. 24 and 25 which are respectively right side and rear elevations of this plunger. This plunger, however, is provided with a hole or bore 60 extending lengthwise thereof from its lower end well towards its upper end in which bore is placed the detent spring 61 the operation of which will be hereinafter described.

The strictly release mechanism including the release plunger and the detent plunger already mentioned and the parts now to be described reaching back to the trigger 64 are all assembled as a unit below the receiver of the rifle upon or within an inverted U-shaped longitudinally extending housing 62 of which Fig. 13 is a side elevation as seen from the right hand side of the rifle and Fig. 14 is a rear end view and Fig. 15 a view as seen from below the rifle. This housing is conveniently and preferably made of stamped or pressed sheet metal of proper gage and quality, or can be made as a die casting. The upper or connecting part 62[1] is curved to fit the curve of the bottom of the portion of the receive to which it is to be fastened and the opposite ends of this connecting part are provided with holes 62[2] through which headed screws 63 extend from its lower side into suitable screw-threaded holes provided in the wall of the receiver whereby the said housing is securely and rigidly fastened to the receiver. Said connecting portion of the housing is provided with holes 58[1] and 59[1] located respectively opposite the hole 58 in the receiver for the detent plunger and the hole 59 in the receiver wall for the release plunger, said holes in the housing being of a size to permit the free passage therethrough of the said respective plungers.

Between the spaced parallel depending sides of the housing 62 there is placed and pivotally mounted thereto the upper bifurcated end of trigger 64 as by a pivot pin 65 extending through the two walls of the housing and the spaced upper parts of the trigger as appears in Figs. 1 to 5. Slightly below this pivot pin 65 there is located between the separated parts of the upper end of the trigger the release lever 66 of which a right side elevation is shown in Fig. 19. In normal cocked position of the gun this release lever 66 is substantially in horizontal position or parallel to the axis of the receiver as shown in Figs. 1, 2 and 3 and with the release plunger 57 extending upwardly therefrom at substantially right angles as appears in said Figs. 1 to 3. The forward end of this release lever 66 is pivotally attached to the lower end of said release plunger 57 as by a pin 67 projecting through the forward hole 68 in said lever 66 and through aligned holes 69 in the lower bifurcated end of said release plunger 57, in the slot between which bifurcated ends is located the forward end of said lever 66.

Through the centrally located hole 70 in the release lever there extends a pin 71 which pin extends through the considerably larger holes 72 in the trigger slightly spaced down from the pivotal pin 65. This pin projects out through said enlarged holes in the trigger and its ends are carried by the sides of said housing 62. Slightly spaced downward from this centrally located hole 70 in the release lever there begins a recess 73 extending upwardly from the lower side of said lever and of a width to receive therein the lower pin 74 the outer ends of which are mounted in the lowermost pair of holes 75 in the trigger which holes are located below the lower edge of this portion of the housing 62.

The lower end of the detent plunger 54 is provided with a slot 77 extending from front to rear thereof as appears in Fig. 25 and the spaced lower parts of said plunger are provided with aligned holes 78 through which extends the pin 76 by means of which a pivotal and slidable connection is made with the forward end of the detent lever 79. The shape of this detent lever 79 in side elevation is shown in Fig. 20 as being of general rectangular elongated shape. Conveniently and preferably, however, this lever is formed in two symmetrical pieces as seen from above in Fig. 21. In other words, the complete lever is composed of a right hand lever and a left hand lever with the front third of each half lying close together as shown in Fig. 21 and with the middle portion of the two halves spaced apart as shown in Fig. 21 and with the approximately rearward third of the two halves spaced still further apart as appears in said Fig. 21 and also in the bottom view of the assembled release mechanism shown in Fig. 16. These two parts of the detent lever 76 are conveniently formed of pressed or stamped sheet metal of the proper thickness and strength. In the forward third of both pieces is provided a recess 80 extending up from the bottom edge of the parts into which recess extends the middle portion of the pin 76 mentioned as placed in the hole 78 at the lower end of the detent plunger 54. The two close lying forward ends of both pieces of the detent lever 79 are mounted in the slot 77 in said detent plunger 54 and are held therein by said pin 76. The middle portions of the two halves of the detent lever lie closely within the opposite side walls of the housing 62 and are pivoted to said housing by a pin 81 extending through aligned holes 82 in the central portion of both halves of the detent lever and also through aligned holes 83 in both walls of the housing 62 located in the forward half of said housing as appears in the separate side view thereof, Fig. 13.

As best appears in the separate side view of one of the two complementally formed halves of the detent lever as shown in Fig. 20 the rear third 84 is about half the height of the rest of said detent lever and this reduced width portion 84 has its lower edge in line with the lower edge of the rest of the lever. In other words, its reduced width might be said to be made by cutting away the upper half of the metal at this point. These narrow rear portions 84 straddle the lower end of the release plunger or releasable holding member, as it may be called, 57. The upper edges of the two parts 84 of this detent lever bear against the lower side of the opposite projecting ends of the pin 67 which projects through the said plunger or holding member 57 and also through the front end of the release lever 66. It will be now obvious that as said release lever is mechanically articulated to the trigger 66, pulling rearwardly upon the handle of the trigger will move the forward part of the lever 66 downward carrying therewith not only the release plunger 57 but also the rearward half of the detent lever 79 and at the same time will move the forward end of said detent lever upwardly or towards the receiver bringing these release mechanism parts proper from the position shown in Figs. 1, 2 and 3 to the position of these parts shown in Figs. 4 and 5.

The operation of the rifle and particularly the operation of the release mechanism will now be described. It will be assumed that the parts of the rifle and particularly of the release mechanism and its co-operating parts will be in the cocked position of the rifle as shown in Figs. 1, 2 and 3. In this position the hammer 23 will be slightly forward from its extreme rearward position and is held by the release plunger or releasable holding member 57 which holding member has its point or face 56 at its upper end projecting into the chamber of the receiver and engaging the forward face 55 at the lower part of the front of the hammer. The hammer spring 28 is under compression and is exerting its tension upon the hammer by the forward end of said hammer spring bearing against the flange 47 at the forward end of said hammer. The breech bolt 22 is in forward position with its front end against the rear end of the barrel but the firing pin 24 is in rearward position operatively connected to the hammer as already described through the fingers at the rear of the firing pin engaging the pockets upon the hammer. The release plunger 57, or as it is called in some of the claims, the releasable holding member, is yieldingly held up in contact with the hammer and against accidental disengagement therefrom by reason of the downward tension placed upon the upper edge of the forward end of the detent lever 79 by the holding spring 85 coiled about the detent plunger 54 and having its upper coil engaging the inner or lower surface of the connecting portion 62[1] of the housing 62. The tension from this spring exerted upon the upper part of the front end of said detent lever 79 obviously operates to hold the rear narrow part 84 of said detent lever up to the limit of its movement and against the projecting ends of the pin 67 which pivotally connects the release plunger 57 and the release lever 66. Upon pulling the trigger as already mentioned the release plunger 57 will be drawn down and disengaged from the hammer and at the same time the detent plunger 54 will be raised so that its upper end projects into the chamber of the receiver. Instantly upon the disengagement of the release plunger 57 from the hammer, the hammer under the urge of the hammer spring will fly forward carrying therewith the firing pin and effecting a firing operation of the cartridge that is in the barrel of the rifle. Sectional view Fig. 4 shows the position of the breech bolt, the hammer and firing pin and also the trigger and its directly connected parts at the instant the hammer and firing pin go to their forward position but before the hammer and breech bolt have been driven back by the blow back from the firing of the gun. This position of the parts is shown for the purpose of illustration but it will be understood that the parts are never in this position in a state of repose. Actually within a very small fraction of a second the hammer and breech bolt are driven back to the position of the parts shown in Fig. 5. In other words, the force of the blow back has driven the breech bolt rearwardly and carried therewith the hammer and the firing pin to the position of these parts shown in Fig. 5. It will be noticed that in both Figs. 4 and 5 the trigger is still shown in "pulled" position and the release plunger depressed and the detent plunger projecting into the chamber of the receiver. This is the actual position of the trigger not only when the hammer is forward as shown at the instant of firing in Fig. 4, but even at the instant the hammer and breech bolt are returned to retracted position as shown in Fig. 5. The reason for this is that the driving forward of the hammer and the retraction of the breech bolt and the hammer by the force of the blow back from the firing of the gun all take place with such lightning-like rapidity that it is physically impossible for the shooter to remove the pressure of his finger from the pulled trigger by the time the breech bolt and hammer come to retracted position.

As already mentioned the pulling of the trigger operated to cause the detent plunger to be projected into the chamber of the receiver and into the path of the breech bolt when it is driven back. Upon the driving back of the breech bolt after a firing operation the cam 45 upon the lower side and rear end of the breech bolt engages with a camming action the projected upper end of the detent plunger 54 notwithstanding the raised position of the front end of the detent lever 79 as shown in Figs. 4 and 5 due to the shooter's pressure still acting upon the trigger. This camming engagement of the breech bolt operates to depress the detent plunger against the tension of its contained detent spring 61. Such depression of this detent plunger is allowed through the already mentioned slidable and pivotal connection of the pin 76 in the slotted lower end of said plunger being allowed to ride downwardly through the open bottom recess 80 in the forward end of the detent lever. Accordingly the forcefully actuated rearwardly moving breech bolt does temporarily force this detent plunger down without disturbing the detent lever or any of its connected parts back to the trigger. The detent plunger is so held down for the interval of time while the breech bolt is going rearwardly until the detent notch 51 comes opposite the detent plunger. As soon as the forwardly directed face 52 of said notch upon the breech bolt is in line with or to the rear of rearwardly directed face 50 of the detent plunger, the detent plunger is free to ascend and does ascend again into the receiver and into the notch in the breech bolt and said detent plunger is potentially in position to engage the breech bolt as soon as it has completed its rearward movement and starts forward. Soon after starting forward the detent plunger has its upper point or face engage the said forwardly facing detent shoulder upon the breech bolt. During the driving back of the breech bolt the hammer 23 has been immediately to the rear of the breech bolt and after the hammer strikes and is stopped by the recoil plug 27 the reaction from such striking and the tension of both the hammer spring and the breech bolt spring operate to start the hammer and the breech bolt forward together. However, as soon as the breech bolt has been arrested by the detent plunger as just described, the hammer is also arrested. All of the parts are then in the position shown in Fig. 5 and the parts will stay in this position for the appreciable time that it takes the shooter to remove his finger pressure from the trigger. As soon as the finger pressure upon the trigger begins to be released the holding spring 85 coiled about the detent plunger operates by the chain of parts already described to begin to move the holding plunger upwardly into the chamber of the receiver slightly forward from the engaging face 55 on the said hammer as appears in Fig. 5 and at the same time the detent plunger begins to be withdrawn from the chamber of the receiver and particularly from the shoulder of the breech bolt. It will be seen that as the parts are balanced and simultaneously moved the holding plunger will be in potential holding position to engage the face 55 upon the hammer by the time the point of the detent plunger is entirely withdrawn from the detent shoulder upon the breech bolt. Upon such total disengagement of the point of the detent plunger from the shoulder of the breech bolt, the breech bolt will under the impulse of its breech bolt spring at once go forward to its forward position performing in the meanwhile its function of chambering the new cartridge in the barrel. The projecting of the holding plunger 57 into the receiver, however, prevents the hammer from moving but a small fraction of an inch; that is, until it moves from the position shown in Fig. 5 to the position shown in Figs. 2 and 3.

I claim:

1. In a release mechanism for semiautomatic firearms, the combination of a receiver, a breech bolt slidingly mounted therein and driven back by the firing of the gun and having in its lower side a forwardly directed detent face, a breech bolt spring compressed by rearward movement of the breech bolt, a hammer slidingly mounted adjacent the breech bolt and moved to rearward position by the rearward movement of the breech bolt and having upon its lower side a forwardly directed contact face, a hammer spring placed under compression by rearward movement of the hammer, a releasable holding plunger having its inner end engageable with said face on the hammer when the hammer is in cocked position, a detent plunger having its inner end engageable with said contact face on the breech bolt when the breech bolt positions the hammer back of cocked position, a trigger, a release lever moved by the trigger and operatively connected to the said holding plunger, a detent lever pivotally supported intermediate its ends and having its forward end connected with a loose motion to said detent plunger and having its rear end depressed by withdrawal of the said holding plunger, a spring yieldingly holding said holding plunger in upward position and a detent spring operatively connected to the detent plunger and urging said plunger upwardly when the trigger is pulled.

2. In a release mechanism for semiautomatic firearms, the combination of a receiver, a breech bolt slidingly mounted therein and driven back by the firing of the gun and having in one side a forwardly directed detent face, a breech bolt spring compressed by rearward movement of the breech bolt, a hammer slidingly mounted adjacent the breech bolt and moved to rearward position by the rearward movement of the breech bolt and having upon one side a forwardly-directed contact face, a hammer spring compressed by rearward movement of the hammer, a releasable holding plunger having its inner end engageable with the said contact face on the hammer when the hammer is moved rearwardly, a detent plunger having its inner end engageable with said detent face on the breech bolt when the breech bolt positions the hammer back of cocked position, a trigger, a release lever moved by the trigger and operatively connected to the said holding plunger, a detent lever pivotally supported intermediate its ends and having its forward end connected with a loose motion of the projecting end of the detent plunger and having its rear end moved outwardly by withdrawal of the holding plunger, a spring operatively connected to and yieldingly holding the said holding plunger in inward position and a detent spring mounted in operative connection with the detent plunger and urging said plunger inwardly when the trigger is pulled.

3. In a release mechanism for semiautomatic firearms, the combination of a guideway, a breech bolt slidingly mounted in relation thereto and driven back by the firing of the gun and having in one side a forwardly directed detent face, a breech bolt spring compressed by rearward movement of the breech bolt, a hammer slidingly mounted adjacent the breech bolt and moved to rearward position by the rearward movement of the breech bolt and having upon one side a forwardly directed contact face, a hammer spring compressed by rearward movement of the hammer, a releasable holding member having its inner end engageable with the said contact face on the hammer when the hammer is at cocked position, a movable detent member having its inner end engageable with said detent face on the breech bolt when the breech bolt positions the hammer back of cocked position, a trigger, means operatively connecting said trigger to said releasable holding member whereby pulling of the trigger disengages the said holding member from the said contact face on the hammer, pivotally supported means having its forward end operatively connected with a loose motion to said detent member and having its rearward end operatively connected to said releasable holding member whereby movement of said holding member away from the hammer urges said detent member into the path of the said face upon the breech bolt, a spring operatively connected to said holding member and yieldingly projecting said member inwardly.

4. In a release mechanism for semiautomatic firearms, the combination of a receiver, a breech bolt slidingly mounted therein and driven back by the firing of the gun and having in its lower side a forwardly directed detent face, a breech bolt spring compressed by rearward movement of the breech bolt, a hammer slidingly mounted adjacent the breech bolt and moved to rearward position by the rearward movement of the breech bolt and having upon its lower side a forwardly directed contact face, a hammer spring placed under compression by rearward movement of the hammer, a releasable holding plunger having its inner end engageable with said face on the hammer when the hammer is in cocked position, a detent plunger having its inner end engageable with said contact face on the breech bolt when the breech bolt positions the hammer back of cocked position, a trigger, a release lever moved by the trigger and operatively connected to the said holding plunger, a detent lever pivotally supported intermediate its ends and having its forward end connected with a loose motion to said detent plunger and having its rear end depressed by withdrawal of the said holding plunger, a spring yieldingly holding said holding plunger in upward position and a detent spring operatively connected to the detent plunger and urging said plunger upwardly when the trigger is pulled, the breech bolt rearwardly of its detent face temporarily resisting the upward urge of said detent plunger as the breech bolt moves rearwardly until the detent face registers with said detent plunger.

5. In a release mechanism for semiautomatic firearms, the combination of a receiver, a breech bolt slidingly mounted therein and driven back by the firing of the gun and having in one side a forwardly directed detent face, a breech bolt spring compressed by rearward movement of the breech bolt, a hammer slidingly mounted adjacent the breech bolt and moved to rearward position by the rearward movement of the breech bolt and having upon one side a forwardly-directed contact face, a hammer spring compressed by rearward movement of the hammer, a releasable holding plunger having its inner end engageable with the said contact face on the hammer when the hammer is moved rearwardly, a detent plunger having its inner end engageable with said detent face on the breech bolt when the breech bolt positions the hammer back of cocked position, a trigger, a release lever moved by the trigger and operatively connected to the said holding plunger, a detent lever pivotally supported intermediate its ends and having its forward end connected with a loose motion to the projecting end of the detent plunger and having its rear end moved outwardly by withdrawal of the holding plunger, a spring operatively connected to and yieldingly holding the said holding plunger in inward position and a detent spring mounted in operative connection with the detent plunger and urging said plunger inwardly when the trigger is pulled, the breech bolt rearwardly of its detent face temporarily resisting the inward urge of said detent plunger as the breech bolt moves rearwardly until the said detent face registers with said detent plunger.

6. In a release mechanism for semiautomatic firearms, the combination of a guideway, a breech bolt slidingly mounted in relation thereto and driven back by the firing of the gun and having in one side a forwardly directed detent face, breech-bolt returning means operative upon rearward movement of the breech bolt, a hammer slidingly mounted adjacent the breech bolt and moved to rearward position by the rearward movement of the breech bolt and having upon one side a forwardly directed contact face, hammer-returning means operative upon rearward movement of the hammer, a releasable holding member having its inner end engageable with the said contact face on the hammer when the hammer is at cocked position, a movable detent member having its inner end engageable with said detent face on the breech bolt when the breech bolt positions the hammer back of cocked position, a trigger, means operatively connecting said trigger to said releasable holding member whereby pulling of the trigger disengages the said holding member from the said contact face on the hammer, pivotally supported means having its forward end operatively connected with a loose motion to said detent member and having its rearward end operatively connected to said releasable holding member whereby movement of said holding member away from the hammer projects said detent member into the path of the said face upon the breech bolt, a spring operatively connected to said holding member and yieldingly projecting said member inwardly, rearward movement of said breech bolt operating to prevent entry of said detent member into the path of the breech bolt until the said detent face aligns with said detent member.

7. In a release mechanism for semiautomatic firearms, the combination of a receiver, a breech bolt slidingly mounted therein and driven back by the firing of the gun and having in its lower side a forwardly directed detent face, a breech bolt spring compressed by rearward movement of the breech bolt, a hammer slidingly mounted adjacent the breech bolt and moved to rearward position by the rearward movement of the breech bolt and having upon its lower side a forwardly directed contact face, a hammer spring placed under compression by rearward movement of the hammer, a releasable holding member having its inner end engageable with said face on the hammer when the hammer is in cocked position, a detent having its inner end engageable with said detent face on the breech bolt when the breech bolt positions the hammer back of cocked position, a trigger, a release lever moved by the trigger and operatively connected to the said holding member, a detent lever pivotally supported intermediate its ends and having its forward end connected to said detent and having its rear end depressed by withdrawal of the said holding member, a spring yieldingly holding said holding member in upward position, and a detent spring operatively connected to the detent and urging said detent upwardly when the trigger is pulled, said detent and detent lever being constructed and arranged to permit downward movement of said detent against said detent spring.

NICHOLAS L. BREWER.